T. TUFTS.
Thill-Coupling.
No. 219,129.  Patented Sept. 2, 1879.
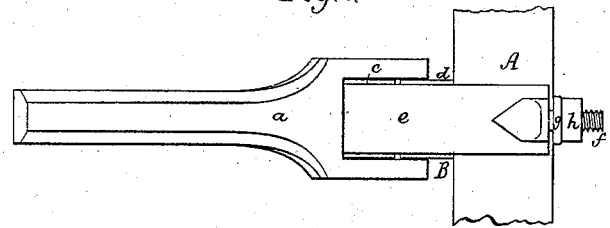
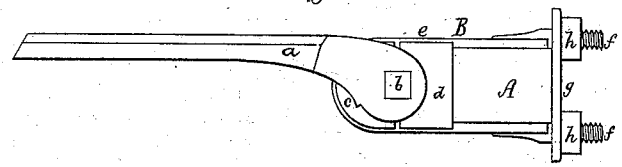
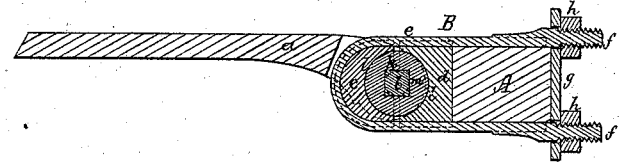
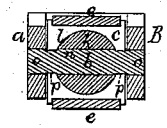
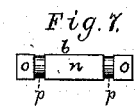
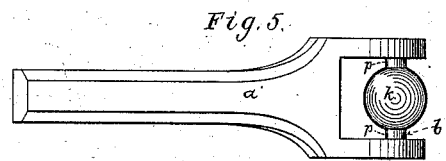
Witnesses.
S. N. Piper.
W. W. Lunt
Inventor,
Timothy Tufts,
by attorney
R. H. Eddy
N. PETERS, PHOTO-LITHOGRAPHER, WASHINGTON, D. C.

UNITED STATES PATENT OFFICE.

TIMOTHY TUFTS, OF SOMERVILLE, MASSACHUSETTS.

IMPROVEMENT IN THILL-COUPLINGS.

Specification forming part of Letters Patent No. 219,129, dated September 2, 1879; application filed February 17, 1879.

*To all whom it may concern:*

Be it known that I, TIMOTHY TUFTS, of Somerville, of the county of Middlesex and State of Massachusetts, have invented a new and useful Improvement in Carriage-Shaft Attachments; and do hereby declare the same to be described in the following specification and represented in the accompanying drawings, of which—

Figure 1 is a top view, Fig. 2 a side elevation, Fig. 3 a longitudinal section, and Fig. 4 a transverse section, of a shaft, shackle, or attachment provided with my invention.

In carrying out my improvement, I arrange the axle and the bearings of the ball-and-joint pin of the furcated arm within a single bow, and with respect to its screws and nuts and clamp-plate, in manner as hereinafter explained, whereby the bow and its clamp-plate, and its screws and nuts, not only answer to connect the joint parts with the axle, but to tighten the bearings on the ball, as occasion or wear may require. Furthermore, I combine a cross-bar and a bow or clasp provided with screws and nuts with the shaft furcated arm and its joint-pin enlarged or provided with a ball, as explained, and with the joint-pin box or bearings having a bearing-socket for the pin and one for the enlargement or ball, all being essentially as shown and described.

In the drawings, A denotes a wheel carriage-axle, or part thereof; and B, the shaft attachment, composed of a furcated arm, $a$, a joint-pin, $b$, a box or bearings, $c\ d$, and a supporting bow or clasp, $e$, with its screws $f\ f$, cross-bar $g$, and nuts $h\ h$, all being formed, applied, and arranged as represented.

The joint-pin $b$ extends from one to the other of the prongs of the arm $a$, and is or should be fixed therein so as to turn therewith. Such joint-pin is provided with a separate spherical enlargement or ball, $k$, to enter a correspondingly-shaped cavity, $l$, made in the two bearings or parts $c\ d$ of the box, and across and opening into the cylindrical pin passage or bearing thereof.

The globe or ball $k$ heretofore has been made in two separate pieces, the pin, after the ball is in place in the socket of the bearings, being driven through them and into the prongs of the forked arm.

I make the ball with a prismatic hole, $m$, going diametrically through it, and I construct that part, $n$, of the pin which is within the ball correspondingly prismatic. I also make prismatic the parts $o\ o$ of the pin, which fit to the prongs of the arm $a$, the intermediate parts, $p\ p$, of the pin being cylindrical. (See Fig. 6, which is an end view of the ball, and Figs. 7 and 8, the first of which is a side view and the second an end view, of the pin.)

To insure the ball being kept in place on the joint-pin, a rivet or pin may be inserted laterally in or through them.

It will be seen that were the ball and pin in one piece, in order to get the pin into the prongs of the fork, they would have to be spread apart sufficiently to admit it into their holes, and afterward be closed or bent toward each other on the pin.

The duplex-pronged bow B and its two screws $f\ f$ and nuts $h\ h$, with the cross-bar $g$, by the arrangement of both axle and bearings within the bow, as shown, serve to confine them together and to the forked arm and its ball and pin.

Fig. 5 is a top view of the furcated arm, with its joint-pin and the ball or spherical enlargement of the pin. This ball or enlargement and its socket operate to prevent wear of the shaft joint-pin and lateral play of the arm $a$ relatively to the box, and the usual rattling or noise consequent thereto. Furthermore, by means of the devices for connecting the box with the axle, the bearings $c\ d$ may be tightened on the joint-pin enlargement, as may be necessary, or as occasion from time to time may require.

It is not new to provide a shaft-coupling with a ball or enlargement and pin or journals in one piece, as will be found by reference to the United States Patents Nos. 14,931 and 123,597, my invention being an improvement on such a coupling.

What I claim in the described improved shaft-coupling is—

The axle A, arranged in the bow B between the bearings $c\ d$ and the clamp-plate $g$, and against the rear bearing, $d$, in combination with the furcated arm, and the joint-pin and ball, arranged with such bearings and bow as set forth.

TIMOTHY TUFTS.

Witnesses:
R. H. EDDY,
W. W. LUNT.